United States Patent [19]

Brenn

[11] Patent Number: 4,481,894
[45] Date of Patent: Nov. 13, 1984

[54] HERBICIDE SPREADER

[75] Inventor: Gary K. Brenn, Washington, Ill.

[73] Assignee: Bron Electronics, Inc., Flat Rock, N.C.

[21] Appl. No.: 380,415

[22] Filed: May 20, 1982

[51] Int. Cl.[3] .............................................. A01C 23/02

[52] U.S. Cl. .......................................... 111/6; 239/163

[58] Field of Search ............... 111/1, 6; 239/172, 146, 239/66, 150-151, 161, 163, 287, 3, 294, 549, 560-561; 47/1.7

[56] References Cited

U.S. PATENT DOCUMENTS

| | | | |
|---|---|---|---|
| 1,124,407 | 1/1915 | Finley | 239/163 |
| 3,012,526 | 12/1961 | Baldwin | 111/6 |
| 3,875,876 | 4/1975 | Pustovoit | 111/1 |
| 4,111,364 | 9/1978 | Schroeder | 239/172 X |
| 4,186,671 | 2/1980 | Huang | 111/6 X |

FOREIGN PATENT DOCUMENTS

| | | | |
|---|---|---|---|
| 214915 | 4/1958 | Australia | 47/56 |

*Primary Examiner*—Robert A. Hafer
*Assistant Examiner*—D. D. DeMille
*Attorney, Agent, or Firm*—Trexler, Bushnell & Wolters, Ltd.

[57] ABSTRACT

A herbicide spreader is provided for pulling by a farm tractor over a tilled field. The herbicide spreader is provided with a pump for projecting water spray from nozzles down against the surface of the earth. Further nozzles and an air compressor apparatus air provided forwardly and rearwardly of the water jets for projecting air jets against the surface of the earth forwardly of the herbicide laden jets to clear rubble from the path of the water jets, and trailing air jets blow the herbicide laden water down into the earth.

5 Claims, 4 Drawing Figures

HERBICIDE SPREADER

BACKGROUND OF THE INVENTION

In the tillage of fields for farming it is known that a well tilled or plowed field is susceptible to wind erosion. It is recognized that if the field is not level there will also likely be water erosion. It further is known that both wind and water erosion can be minimized by not clearing and tilling the field too thoroughly. Part of the residue of previous seasons crop should be left to help to retain the soil in place.

However, it has been found that such mulch and rubble left in a field interferes with penetration of herbicide and other substances added to the earth by water spray. Some improvement can be produced in penetration by the use of higher pressures, but there is a practical limit in that above about 40 psi water sprayed from conventional nozzles tends to become a fine mist with practicallly no penetration capabilities, and which may readily blow away. Some improvement can be attained by adding excess water, but this requires almost constant refilling of water tanks on spreaders. Farmers are reluctant to stop to refill water tanks. As a result of all of the foreging, minimally tilled fields left with mulch and rubble tend to have herbicide and the like ineffectively dispersed therein.

OBJECTS AND SUMMARY OF THE PRESENT INVENTION

It is an object of the present invention to provide improved means for dispersing herbicide and the like in a field retaining mulch or rubble.

More particularly, it is an object of this invention to provide such means in the form of an apparatus having jets of water with herbicide or the like contained therein in combination with air jets for effecting much more efficient penetration of the earth by the herbicide-born water.

In attaining the foregoing and other objects of the present invention, and carrying out the principles of this invention, I provide a spreader for water-born herbicide or the like in which there are a plurality of liquid jets directed down at the earth, accompanied by a plurality of air jets also directed down at the earth. The air jets may follow immediately behind the water jets, and act aggressively to force the water down into the soil. In accordance with further concepts of the invention the air jets may precede the water jets, in which case rubble of one sort or another is stirred up to facilitate contacting and penetration of the earth by the water jets. In ultimate form, air jets both precede and follow the water jets to attain the benefits of both positions. The air jets may be on the same level with the water jets, but in many instances have been found to be more effective when on a lower level, i.e. closer to the earth than the water jets. Although the water jets operate continuously, and the air jets may also operate continuously, I have found that this constitutes inefficient use of compressed air. A simple valving arrangement providing for pulsing of the compressing air attains equally good results with a greatly reduced consumption of compressed air.

DRAWING DESCRIPTION

The present invention will best be understood with reference to the following specification when taken in connection with the accompanying drawings wherein.

DETAILED DESCRIPTION OF THE ILLUSTRATIVE EMBODIMENTS

Figure 1:
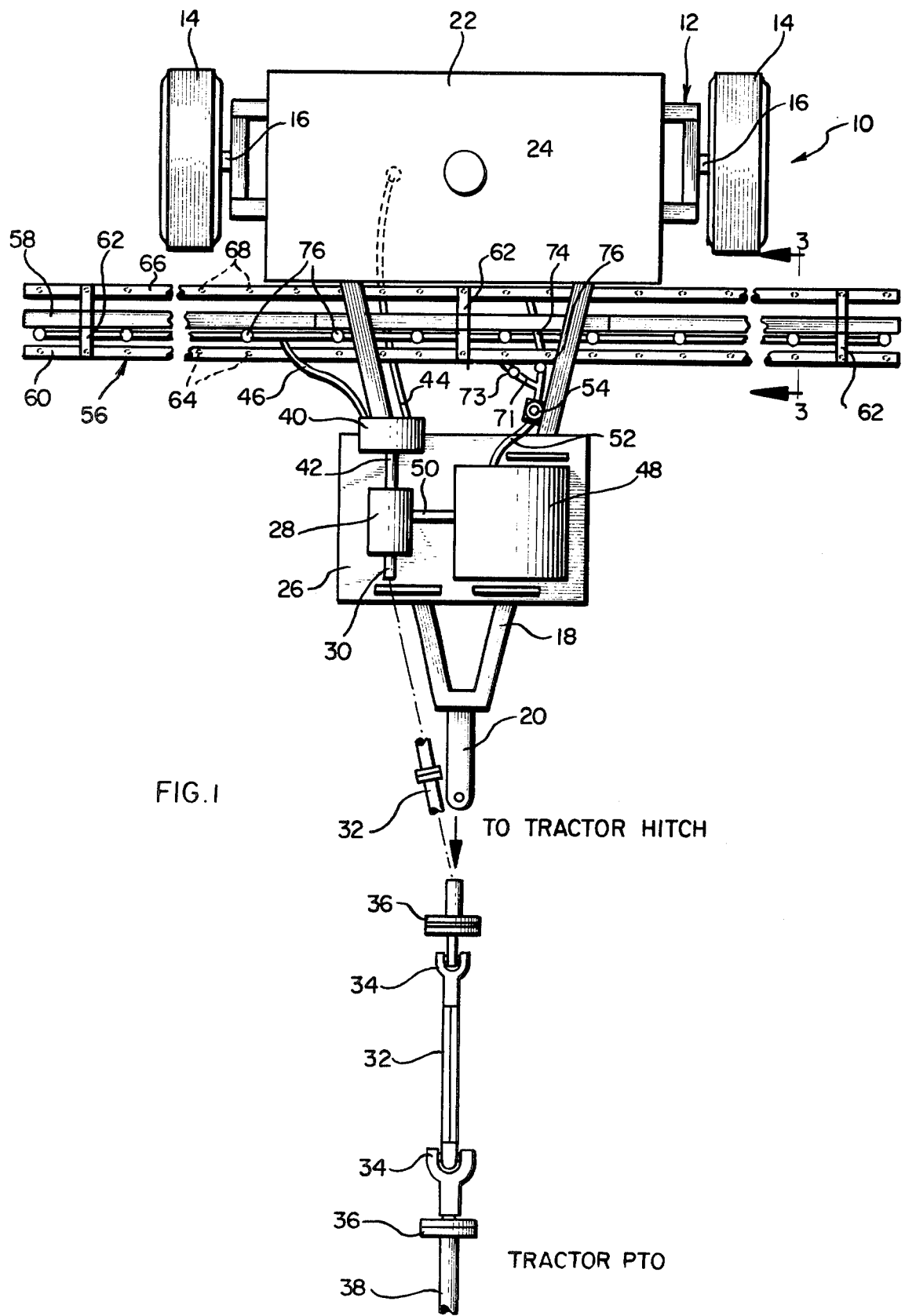
FIG. 1 is a plan view of a spreader constructed in accordance with the principles of this invention.
Figure 2:
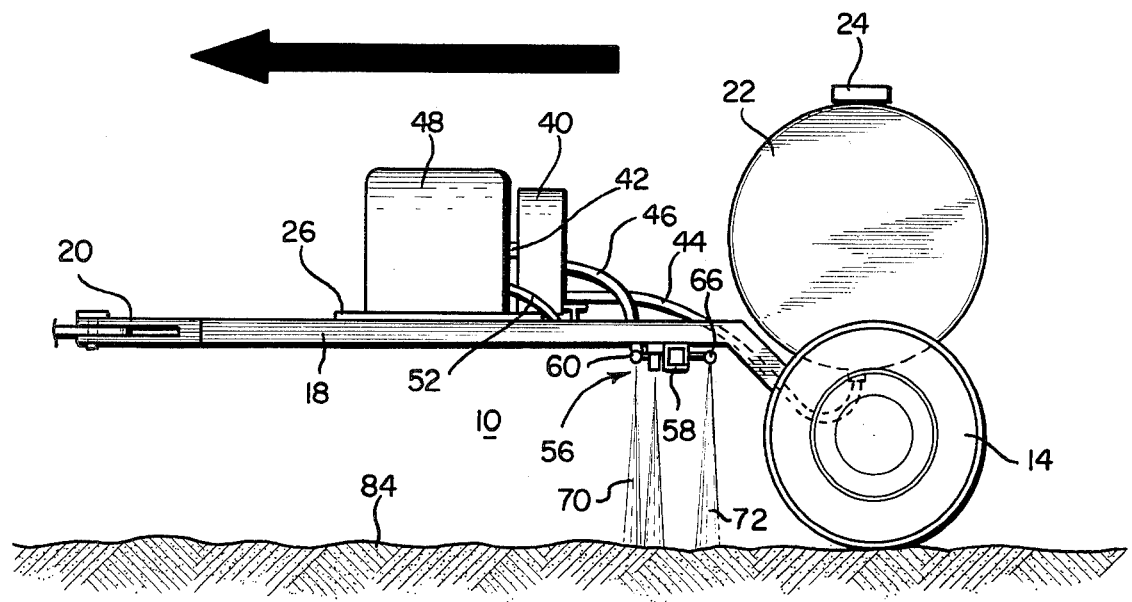
FIG. 2 is a schematic view thereof.

Referring now more specifically to the drawings, and first to FIGS. 1 and 2, there is shown a herbicide spreader 10 constructed in accordance with the principles of the present invention and including a carriage 12 including a suitable framework and a pair of preferably rubber-tired wheels 14 rotatably mounted on axles 16. An A-frame member 18 extends forwardly from the carriage and has a tongue 20 at the apex for attachment to a tractor hitch for towing the spreader behind a conventional farm tractor.

A liquid-carrying tank 22 having a filler cap 24 on the top thereof is suitably supported on the carriage 12 for carrying herbicide or the like dispersed or dissolved in water.

A platform or floor 26 is welded or otherwise suitably secured on the A-frame structure 18 and carries a gear drive device 28 having an input shaft 30 driven by suitable shafts 32, universal joints 34, and slip clutches 36 from the tractor power take off indicated at 38.

A liquid pump 40 is mounted on the platform 26 and is driven by a shaft 42 from the gear drive device 28. An inlet hydraulic conduit 44 leads from the bottom of the tank 22 to the inlet or input side of the pump 40, while an outlet conduit 46 leads to a dispersing system to be described shortly hereinafter.

There is also an air compressor and reservoir 48 mounted on the platform 26 and driven by a shaft 50 from the gear drive device 28. The air pump and reservoir unit 48 obtains air from the atmosphere, and is provided with an output conduit or line 52 which also leads to the dispersing apparatus hereinafter to be described, preferably through a pulsing device 54. This pulsing device may comprise a solenoid valve which is opened and closed at a desired rate by an electronic control, or more simply it may comprise a rotary valve turned at an adjustable rate that may be set in accordance with field conditions by an electric motor. Such an electric motor could be of rather small power output, since all that is required to do is to turn the rotor or spool of a pneumatic valve.

A transverse dispersing apparatus or boom 56 is secured to the underside of the A-frame 18 and includes a square section beam 58 forming the main frame thereof. This beam is welded or otherwise secured to the underside of the A-frame 18 transversely of the direction of movement of the tractor and of the spreader. As may be seen in FIGS. 1-3 there is a forward air dispersing tube or pipe 60 supported from the beam parallel thereto and substantially coextensive therewith by suitable supports 62. The tube 60 has a plurality of downwardly pointing nozzles 64 in spaced relation thereon.

The supports 62 also carry a trailing air dispensing tube 66 of the same length as the tube 60 and having a plurality of downwardly directed nozzles 68 in spaced relation therealong.

Compressed air from the outlet conduit 52 and through the pulsing device 54 is supplied through a branch conduit 71 and an on-off valve 73 to the leading air tube 60, while a second branch 74 having a valve 76 therein supplies air 70 and 72 to the trailing tube 66. The valves 73 and 76 and provided so that the operator of the equipment in his best judgement may supply jets of air either from the forward nozzles 64 or the trailing nozzles 68, or both.

A water or liquid dispersing tube 78 having a plurality of nozzles 80 spaced therealong is carried by the supports 62 forwardly of the beam 58, and hence in closer proximity to the leading tube 60 than to the trailing tube 66. Jets of liquid 82, in the present example comprising water with herbicide dissolved or suspended therein are blown down against the surface of the earth 84 along with the air jets 70 and 72. It will be observed that the nozzles are provided in groups of three aligned with the direction of travel, i.e. the leading air nozzles 64, the liquid nozzles 80, and the trailing air nozzles 68 being in sets aligned logitudinally of the direction of travel.

Figure 4:
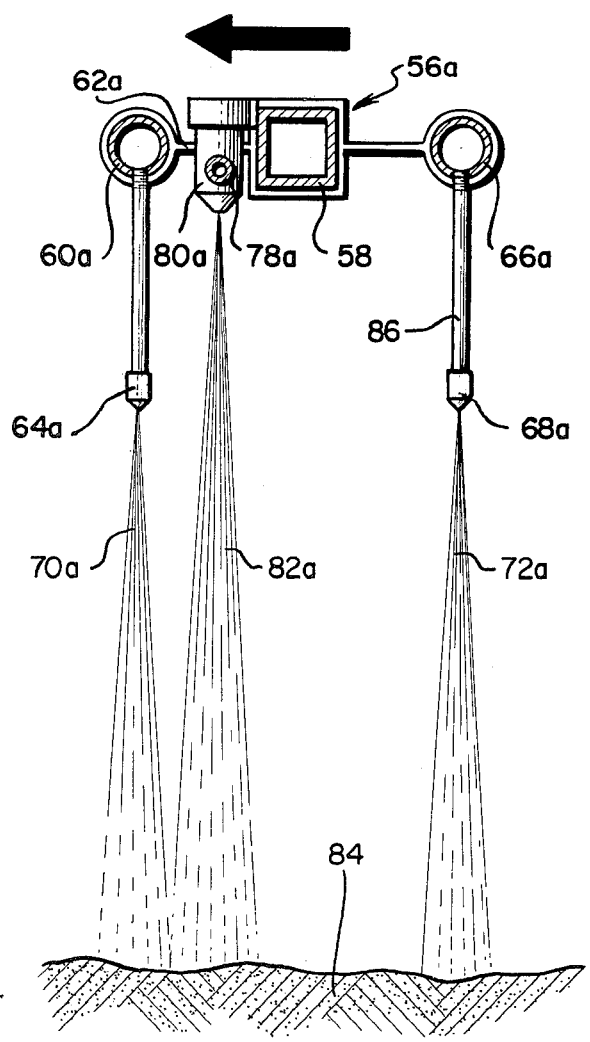
FIG. 4 is a view similar to FIG. 3 showing a modification of the invention.

As will be understood, the liquid jets or streams 82 are less likely to be disturbed or disrupted by their passage through the air than are the air jets or streams 70 and 72. Accordingly, it is sometimes desirable to place the air nozzles closer to the ground than the liquid nozzles. A modified structure adapted to this purpose is illustrated in FIG. 4. Similar numerals are utilized with the addition of the suffix a, whereby further description is believed to be unnecessary, except to point out that the air nozzles 64a and 68a provided with extension links 86 and thus are closer to the ground than are the liquid nozzles 80a. This provides for less disruption of the air jets, and also provides for a shorter time span between impingement of the air and herbicide laden water against the ground.

Figure 3:
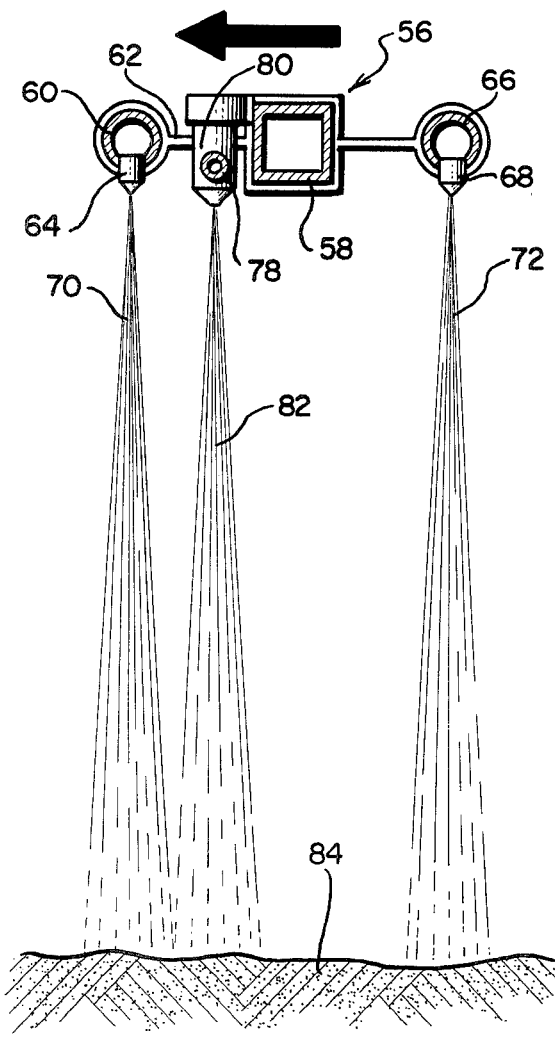
FIG. 3 is a side view on an enlarged scale as taken substantially along the line 3—3 in FIG. 1.

Movement of the herbicide spreader is in the direction indicated by the arrows in FIGS. 2-4, i.e. from right to left in these drawings, and is from top to bottom in FIG. 1. The air jets 70 or 70a first impinge upon the surface of the earth and dislodge material therefrom, such as mulch and other rubble so that the herbicide laden jets 82, 82a impinge upon the bare earth more efficiently than would be possible if rubble of one sort or another lay upon the surface of the earth. The subsequent air jets 72, 72a aid in blowing the herbicide laden water down into the earth before any of the water can evaporate or be blown away. Under given field conditions it may be preferable to operate only the leading or the trailing air jets, and not both. For example when spraying into an untilled field of hay or other cover crop the leading air jets may not be required. The trailing air jets may not be required. The trailing air jets would be required to direct the fine spray through the existing crop canopy for a more effective kill. When spraying residue from prior annular crops, in both tilled and untilled fields, it may be required to utilize both leading and trailing looms. The leading loom will displace existing residue and the trailing boom will prevent the drifting of herbicides into susceptible crops located nearby, especially when herbicides are applied under higher pressures and less gallonage.

In addition, as noted earlier, the volumetric requirements of compressed air can be reduced by pulsing the air jets by use of the pulsing device 54.

The most important aspect of the present invention is that air jets are used in combination with water jets to insure more effective carrying of herbicide or the like laden water into the soil. Various changes in structure will no doubt occur to those skilled in the art, and the examples as set forth herein will be understood as illustrative only.

I claim:

1. Apparatus for dispersing liquid herbicide on the ground comprising a vehicle for movement along the ground, means on said vehicle for carrying a quantity of said liquid herbicide, substantially vertically downwardly directed liquid nozzle means carried by said vehicle, means including pump means carried by said vehicle and connected to said liquid nozzle means and to said liquid herbicide carrying means for projecting a spray of liquid substantially vertically down toward the ground, substantially vertically downwardly directed air nozzle means carried by said vehicle adjacent to and in alignment with said liquid nozzle means, and air pressure means connected to said air nozzle means for projecting air jets substantially vertically down toward the ground said air nozzle means being disposed behind the liquid nozzle means in the direction of movement of said vehicle to drive liquid into the ground.

2. Apparatus as set forth in claim 1 wherein said air nozzle means are disposed both before and behind said liquid nozzle means in the direction of travel of said vehicle for stirring up the ground and material thereon and for subsequently driving liquid into the ground, a said liquid nozzle means being disposed more closely to the air nozzle means ahead thereof than to the air nozzle means behind.

3. Apparatus as set forth in claim 1 including air nozzle means both ahead of and behind said liquid nozzle means in the direction of travel of said vehicle, and valve means for selectively jetting air from the nozzle means ahead of and behind said liquid nozzle means.

4. Apparatus for dispersing liquid herbicide on the ground comprising a vehicle for movement along the ground, means on said vehicle for carrying a quantity of said liquid herbicide, substantially vertically downwardly directed liquid nozzle means carried by said vehicle, means including pump means carried by said vehicle and connected to said liquid nozzle means and to said liquid herbicide carrying means for projecting a spray of liquid substantially vertically down toward the ground, substantially vertically downwardly directed air nozzle means carried by said vehicle adjacent to and in alignment with said liquid nozzle means, and air pressure means connected to said air nozzle means for projecting air jets substantially vertically down toward the ground, said air nozzle means being disposed ahead of said liquid nozzle means in the direction of movement of said vehicle to stir up the ground and material lying thereon, including additional air nozzle means disposed behind the liquid nozzle means in the direction of movement of said vehicle to drive liquid into the ground.

5. Apparatus for dispersing liquid herbicide on the ground comprising a vehicle for movement along the ground, means on said vehicle for carrying a quantity of said liquid herbicide, downwardly directed liquid nozzle means carried by said vehicle, means including pump means carried by said vehicle and connected to said liquid nozzle means and to said liquid herbicide carrying means for projecting a spray of liquid toward the ground, first downwardly directed air nozzle means carried by said vehicle adjacent and in alignment with to said liquid nozzle means and spaced horizontally therefrom in the direction of motion of said vehicle, second downwardly directed air nozzle means carried by said vehicle adjacent to and in alignment with said liquid nozzle means and spaced horizontally therefrom opposite to the direction of motion of said vehicle, air pressure means, and means including selectively operable valve means connecting said air pressure means to said first and second air nozzle means for selectively projecting air jets toward the ground.

* * * * *